March 5, 1935.  C. Z. ROSECRANS  1,993,707
MEASURING SYSTEM
Filed April 7, 1932  3 Sheets-Sheet 2
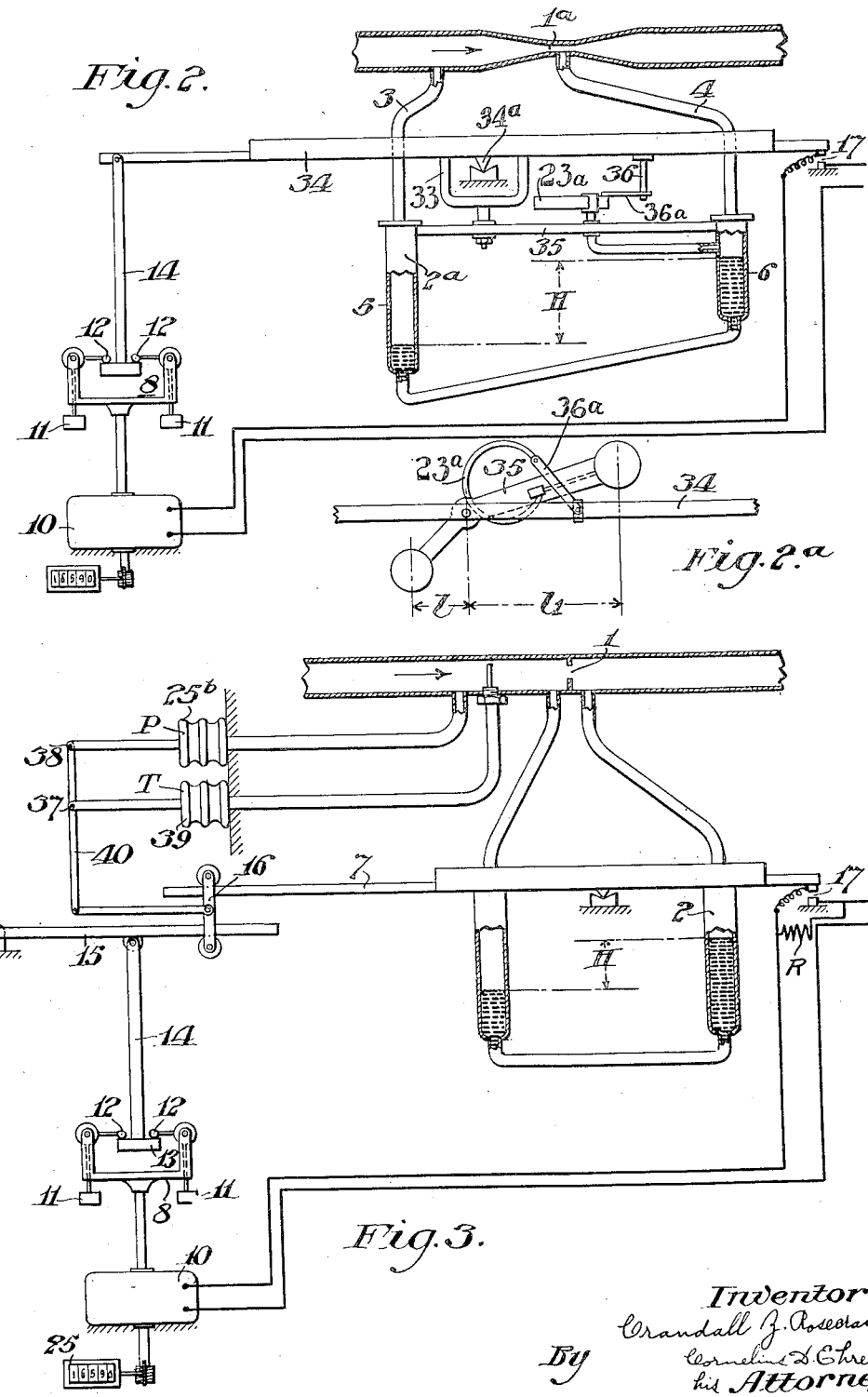

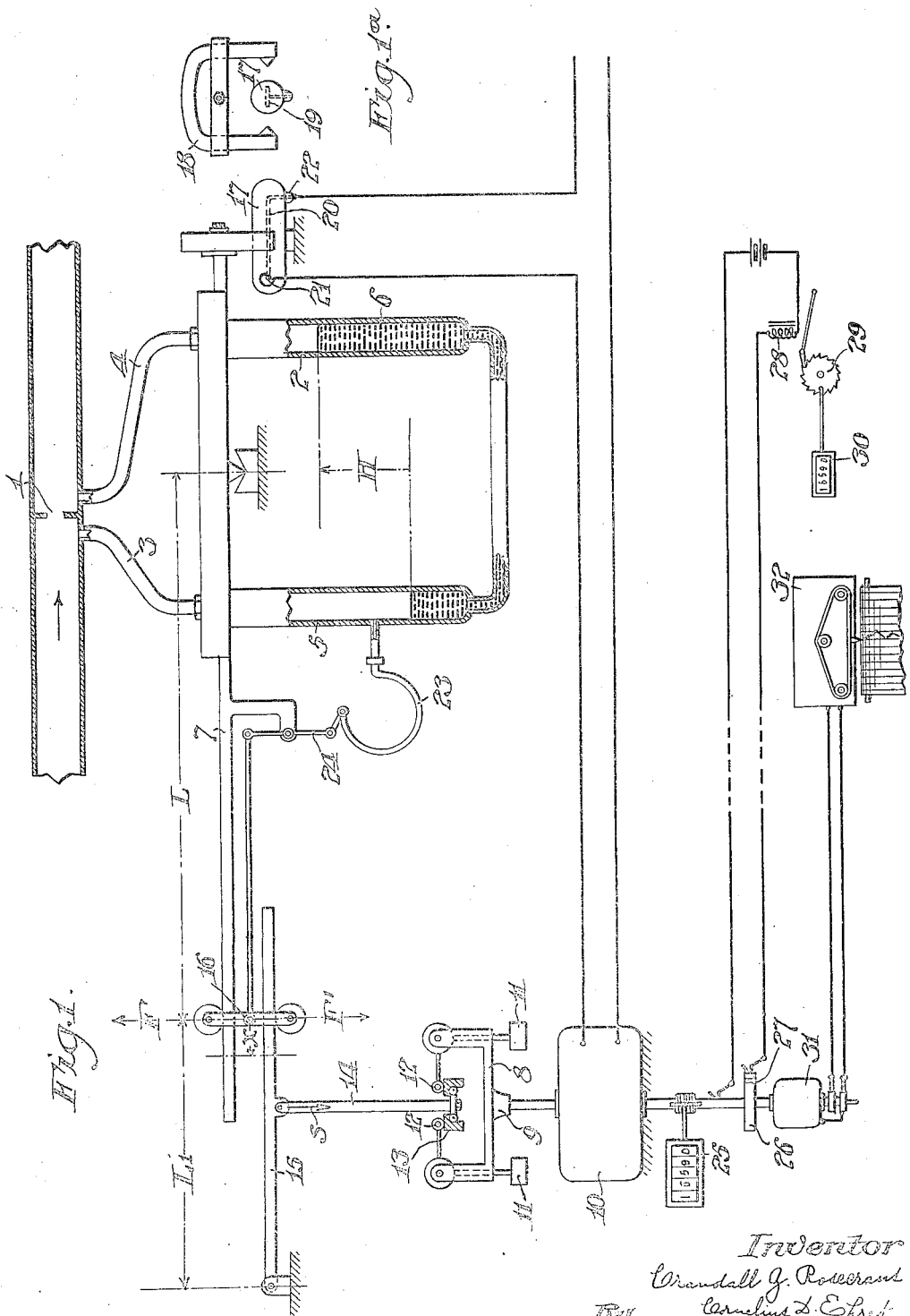

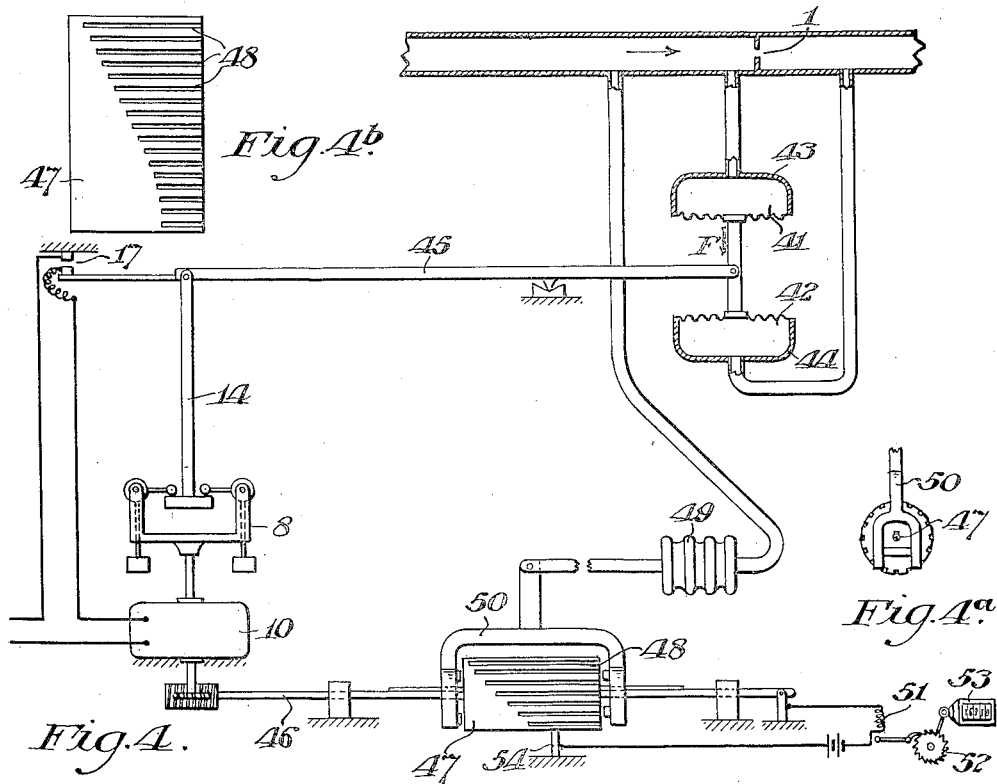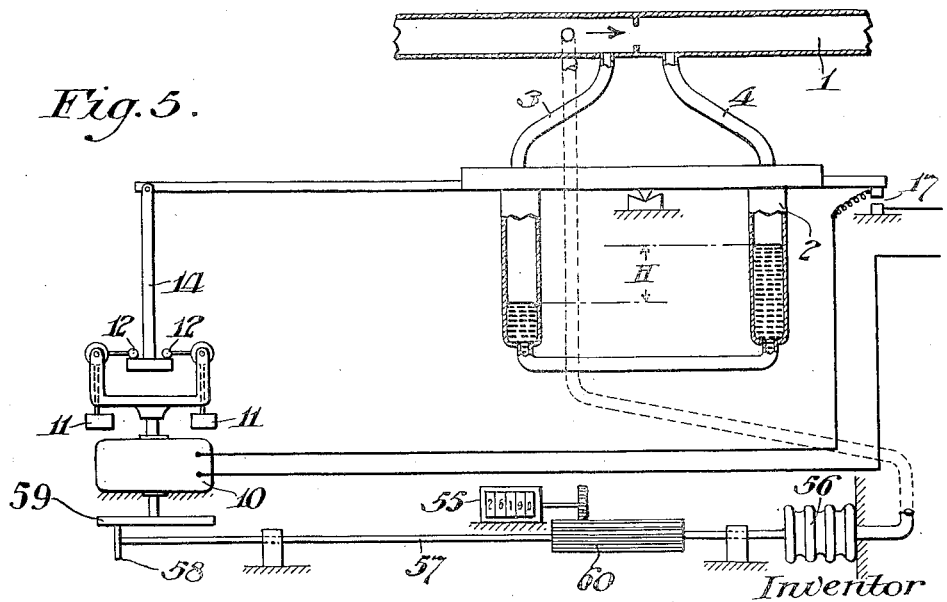

Patented Mar. 5, 1935

1,993,707

UNITED STATES PATENT OFFICE 1,993,707

MEASURING SYSTEM

Crandall Z. Rosecrans, Philadelphia, Pa., assignor to Leeds & Northrup Company, Philadelphia, Pa., a corporation of Pennsylvania Application April 7, 1932, Serial No. 603,725

13 Claims. (Cl. 73—167)

My invention relates to systems for measuring, recording, indicating, or integrating flow of fluids.

In accordance with my invention, the speed of a governor is varied to balance the force acting in the governor against a force proportional to a differential pressure due to flow of the fluid, and the readings of the flow indicating, recording, or integrating instrument associated with the governor are automatically corrected for changes of fluid density, resulting for example, from changes in pressure, or temperature, or both.

More particularly, for measurement of flow in units of weight, the governor force is balanced against a force varying as the product of a factor proportional to the fluid density, as influenced by pressure, and/or temperature, times a factor proportional to the aforesaid pressure difference so that the governor speed is a linear function of the flow in units of weight per unit of time, more specifically, forces proportional to the square of the governor speed and to the square of the rate of fluid flow are balanced in a lever system in which the lever arm ratio is varied by changes in the fluid density.

For an understanding of my invention reference is to be had to the accompanying drawings in which:

Fig. 1 diagrammatically illustrates a system for measuring flow corrected for changes in pressure.

Fig. 1a is a detailed view, in end elevation, of switch mechanism shown in Fig. 1.

Fig. 2 illustrates another form of flow measuring system with automatic correction for change in pressure.

Fig. 2a is a top plan view of parts shown in Fig. 2.

Fig. 3 illustrates another system for measuring flow corrected for changes in pressure and temperature.

Fig. 4 illustrates another modification of the invention.

Fig. 4a is a detailed view in end elevation of an intermittent contact cylinder shown in Fig. 4.

Fig. 4b is a development of the cylinder of Fig. 4a.

Fig. 5 illustrates still a further modification.

In many measurements of fluid flow it is desired to indicate, record or integrate the flow in weight units, for example, pounds per hour. The rate of fluid flow can be determined by measuring the differential pressure created by an orifice, Venturi tube or the like, but the rate of flow is only one of the factors determining the units of weight per unit of time. The density of the fluid also enters the flow equation as follows:

$$W = K\sqrt{DH} \quad (1)$$

in which:

W = flow in weight per unit time.
H = differential pressure as measured by a manometer or equivalent.
D = Density of fluid in weight per unit volume.
K = Constant of proportionality including dimensions of the flow orifice, density of manometer liquid, etc.

It therefore appears that the weight is a non-linear function of the two independent variables H and D, and specifically it is proportional to the square root of the product of these factors.

For liquids, the variation of density with pressure is negligible but the variation of density with temperature cannot be disregarded. The variation may be represented by the formula:

$$D_x = D_0(1 + \alpha t_x)$$

where $D_x$ = density at temperature $t_x$
$D_0$ = density at $t_x = 0$
$\alpha$ = the temperature coefficient of density.

For liquids therefore, the flow meter Equation (1) becomes $$W = K_1\sqrt{H(1 + \alpha t)} \quad (2)$$

where $$K_1 = K\sqrt{D_0}.$$

Referring to Fig. 1, the flow of fluid through the orifice plate 1, or equivalent, produces a difference in pressure on opposite sides of the orifice plate which varies as the square of the rate of flow of fluid through the pipe. In the apparatus illustrated, this difference in pressure is communicated to a pressure responsive device, specifically a manometer tube, by the flexible pipes 3, 4, connected respectively to the different legs 5 and 6 of the manometer 2. The differential pressure across the orifice produces a difference H (of Equations 1 and 2) between the levels of the manometer liquid, as mercury, in the tubes 5 and 6. As the weight of the mercury in the leg 6 is the greater, the differential pressure represented by the difference in head H produces a force tending to rotate the manometer arm 7 in a clockwise direction.

This movement is opposed or restrained by the centrifugal force developed in a governor 8. Upon the member 9 which is driven as by the electric motor 10, are pivotally mounted the centrifugal members 11, whose inner ends 12 bear upon a disk 13 mounted at the lower end of rod 14. Preferably, the disk 13 is mounted on ball bearings or roller bearings to reduce friction, or as shown, it may itself be one of the bearing members. The upper end of rod 14 is connected to a lever 15 which is operatively connected by the link member 16 to the manometer arm 7.

The force F which tends to raise the arm 7 because of the differential pressure H is transmitted through the link member 16 to the lever 15. The force $F_1$ due to the centrifugal force exerted by the fly-balls upon the disk 13, which varies as the square of the speed of the motor, opposes the force due to the differential pressure H. When the differential pressure predominates, the motor switch 17 closes, causing the motor to increase its speed until the force $F_1$ acting upon lever 15 balances the force F impressed upon the arm 7 by the differential head H. As the arm 7 moves in counter-clockwise direction, the switch 17 is opened to decrease the governor speed.

Specifically, the magnet 18 at the end of arm 7 in its upper movement causes the armature 19 of the switch to move upwardly. The switch arm 20 pivoted at 21 and carrying armature 19 is therefore lifted from the contact 22, which may be a pool of mercury. When the motor circuit is broken, the governor speed falls until the differential pressure H again predominates to such extent that the magnet 18 effects reclosure of the switch. This balancing action continuously repeats; the lower the rate of flow, or differential head H, the longer the periods during which the switch 17 is retained open in each cycle. The switch 17 is in effect a variable resistance for controlling the speed of motor 10 to maintain balance between the centrifugal force of the governor and the force due to the differential pressure H. In some cases, a suitably high resistance R may be connected across contacts 20, 22 (Fig. 3).

All other factors remaining constant, the average speed of the motor 10 is a linear function of the rate of flow because the governor force which is proportional to the square of the motor speed has been balanced against the pressure H which varies as the square of the rate of flow.

If, however, the density of the fluid varies or is different from that at which the instrument is calibrated, there is introduced an error which for a given change in density increases with increase of rate of flow. In other words, the error cannot be eliminated by a simple subtraction, even if the change in density is known.

For introducing into the system of Fig. 1, an automatic correction for changes in density, the position of the link 16 is varied to change the effective lever arms of the forces balanced by control of the speed of the motor 10; that is, the balancing ratio of the centrifugal force and the force due to the rate of flow is changed in accordance with the factor $(1+\alpha t)$.

Specifically, in the modification shown in Fig. 1, the Bourdon tube 23 is in communication with the interior of the tube 5 above the manometer liquid. If the pressure upon the fluid being measured increases, the Bourdon tube 23 tends to straighten, swinging the arm 24 pivotally mounted upon the manometer arm 7, in a clockwise direction to move the connecting link 16 to the right to the position shown, decreasing the lever arm L of force F proportional to the differential pressure H and increasing the lever arm $L_1$ of the opposing force $F_1$ due to the governor. The force F exerted on the link by the manometer may be represented by the expression $$F=K_3\frac{H}{L}.$$

Where $K_3$=constant of proportionality covering density of manometer liquid, diameter of manometer tubes, horizontal distance of manometer tubes from pivotal axis, etc. The force $F_1$ exerted on the link by the governor may be represented by the expression $$F_1=K_4\frac{N^2}{L_1}$$

Where $K_4$=constant of proportionality covering mass of fly weights, ratio of lengths of fly weight arms and lever arm of force S, and where N equals the speed of the motor. These forces are made equal by the aforesaid control of the speed of motor 10; i. e.—

$$K_3\frac{H}{L}=K_4\frac{N^2}{L_1}$$

Assuming for simplicity that $L=L_1$ and that the link 16 is displaced by the distance $x$, (Fig. 1).

$$K_5N^2=H\frac{L+x}{L-x}\cong H\left(1+2\frac{x}{L}\right)$$

or where $$K_5=\frac{K_4}{K_3}$$

$$\therefore N=K_6\sqrt{H\left(1\pm2\frac{x}{L}\right)} \quad (3)$$

where $$K_6=\frac{1}{\sqrt{K_5}}$$

The similarity between this equation and the flow meter equation of liquids, (2) is apparent. By proportioning the linkage so that the factor $$\frac{2x}{L}$$

varies as $\alpha t$, perfect compensation is obtained and the speed of the motor 10 is therefore a linear function of the flow of fluid in units of weight, or otherwise expressed the speed of the motor is proportional to the square root of the product of a factor proportional to the differential pressure H times a factor varying with density. The control of the motor speed balances the forces F and $F_1$, and the shifting of link 16 varies the balancing ratio of the forces, or the lever arm ratio of the system in which they are balanced.

With the arrangement shown, a reading of flow can be obtained by a simple tachometer driven from the shaft of motor 10 and calibrated in weight units of flow. The flow can be integrated by connecting a simple revolution counter 25 to the shaft of motor 10. For producing indication of integrated flow at a distance, the shaft may drive a disk 26 carrying a contact 27 for intermittently energizing the solenoid 28 of a step by step driving mechanism 29 for a revolution counter 30. The changes in speed of the motor which represent changes in the flow of units of weight can be recorded by any suitable speed-responsive recorder calibrated in units of flow. For example, the motor 10 may drive a small alternator 31, whose frequency is therefore a function of the rate of flow, and the output of the alternator may be connected to the frequency indicating and/or recording instrument 32, such as for example, shown in Wunsch Patent 1,751,538.

For perfect gases and even for saturated steam over a limited range, the density D is proportional to the absolute pressure of the gas divided by its absolute temperature. For gases, the flow Equation (1) may therefore be written:

$$W = K_7 \sqrt{\frac{PH}{T}} \quad (4)$$

Correction for changes in pressure of a perfect gas, or steam over a limited range, can be obtained in the same manner as density correction for liquids, and with the general arrangement shown in Fig. 1. Assuming that the pressure changes from P1 to P2, other factors remaining constant, $$\frac{W_1}{W_2} = \sqrt{\frac{P_1}{P_2}} = \sqrt{\frac{P_2 + \Delta P}{P_2}} = \sqrt{1 + \frac{\Delta P}{P_2}}$$

If the linkage is designed so that $$\frac{2x}{L} = \frac{\Delta P}{P_2}$$

then the Formula (3) again applies, and the speed of the motor is proportional to the flow of gas corrected for changes in its pressure.

In the system shown in Fig. 2, the density correction is introduced in generally the same, though specifically different, manner. In this modification, the manometer 2a is pivotally mounted to swing about a vertical axis upon a support 33 carried by the control arm 34 pivotally mounted to tilt about a horizontal axis afforded by knife edge 34a or equivalent. The centrifugal force of the governor 8 tends to effect movement of member 34 in a counter-clockwise direction, but this tendency is opposed by a force resulting from the difference in level of the manometer liquid in the tubes 5 and 6. The effective lever arm ratio between these opposing forces is varied by the Bourdon tube 23a having one end fastened to the manometer support 35 and in communication with the fluid above the level of the manometer fluid in tube 6, and whose other end is connected, as by pin 36 and link 36a, to the control arm 34.

Assuming an increase in density or pressure, the tube 23a tends to straighten, to effect clockwise movement of the manometer support 35, Fig. 2a. This varies the effective lever arms $l$, $l_1$ of the manometer tubes, so that in effect the force due to the differential head H, as impressed upon the arm 34, is also a function of the fluid density or pressure.

The speed of the motor for which the forces acting upon the arm 34 are in balance is therefore a linear function of the flow through the venturi 1a in units of weight.

In the modification shown in Fig. 3 which in some respects is similar to that of Fig. 1, the sliding link 16 for varying the balancing ratio of the forces is adjustable by a pressure responsive device 25b which is mounted independently of the manometer, as on a stationary support. Assuming the pivot 37 to be fixed, as the pressure increases, the link 16 is moved to the right, and vice versa, as in the modification of Fig. 1. Assuming the pivot 38 to be fixed, the slide 16 is moved to the left as the temperature of the gas increases and vice versa. Specifically, the bellows or sylphon 39 expands upon increase in temperature of the fluid flowing through the orifice 1 to swing the lever 40 about pivot 38, moving the link 16 to the left. The temperature compensation is obtained in generally the same manner as the pressure compensation except that they vary in opposite senses, that is, an increase in temperature produces movement of the link 16 in the same sense or direction as a decrease in pressure and vice versa.

Assuming the temperature to change from T1 to T2, other factors remaining constant, $$\frac{W_1}{W_2} = \sqrt{\frac{T_2}{T_1}} = \sqrt{1 + \frac{\Delta T}{T_1}}$$

Therefore, by selecting the linkage so that $$\frac{2x}{L}$$

(Equation 3) varies as $$\frac{\Delta T}{T_1}$$

compensation for temperature can be obtained.

As shown in Fig. 3 both pressure and temperature compensation can be impressed upon the same correcting element 16; in other words, the movement of the member 16 is a function of pressure and temperature jointly. The sense and extent of movement of the member 16 will depend upon which of these factors is changing, and in which sense, or if both are changing, on the relative magnitudes of their differential effects and their sense. The arrangement shown in Fig. 3 with both pressure and temperature compensation is particularly suited for measurement of flow of gases in units of weight, for with gases, the effects of both of these factors are substantial, whereas with liquids, as above pointed out, the changes in pressure can usually be ignored. The remainder of the system of Fig. 3 is the same as that of Fig. 1 in construction and operation, and the same reference characters have been applied. Either temperature or pressure compensation may be effected by using only one sylphon and substituting a fixed pivot for the point of connection of arm 40.

In the system shown in Fig. 4, the force F varying as the square of the rate of flow, is produced by the two diaphragms 41, 42 in communication with chambers 43 and 44 connected on opposite sides of the orifice 1 or equivalent. This differential pressure arrangement is the equivalent of the manometer shown in the preceding systems, and may be used as a substitute therefor. The differential pressure acting on the arm 45 is balanced against the centrifugal force of the governor 8, as in the prior modifications, particularly Fig. 3. In this system, however, the density correction, either for changes in pressure or temperature, or both, is not applied to the motor speed, but to elements of the system interposed between the motor and the indicating, recording or integrating device. Specifically, the motor 10 drives a shaft 46 carrying a cylinder 47 rotatable in fixed angular relation to the shaft, but freely slidable along it. The drum 47 carries a plurality of contacts 48 which as shown most clearly in Fig. 4b are of progressively changing length to follow the square root law. The bellows or sylphon 49 is connected to the yoke 50 for sliding the cylinder 47 along shaft 46 in accordance with changes in density of the fluid. The number of impulses imparted by the solenoid 51 to the stepping mechanism 52 or integrator 53 is therefore a function of both the speed of rotation of the shaft 46 which is driven by motor 10, and of the position of the cylinder 47 with respect to the fixed contact 54. For example, the further the cylinder 47 is moved to the left, the greater the number of contacts 48 engage the fixed contact 54 per revolution, and the greater the speed of shaft 46, the greater the number of impulses per unit of time. As the square of the motor speed is proportional to the pressure differential, and the number of current impulses per revolution of drum 47 is proportional to the square root of the density, the number of current impulses in a given period of time is directly proportional to the integrated flow corrected for density changes.

The sylphon 49 may respond either to changes in temperature or pressure. As shown it responds to pressure, but the connection to the fluid conduit and to the yoke 50 for temperature compensation are obvious, particularly in view of Fig. 3. Also in view of that figure the movement of yoke 50 may be jointly effected by temperature and pressure responsive devices.

The modification shown in Fig. 5 is generally the same as that of Fig. 4 in that the density correction is not applied to the motor speed but to elements interposed between the motor and the flow indicating, recording or integrating device 55. Specifically, the bellows 56 or equivalent, responsive to changes in density, changes the ratio of the speed of the shaft 57, which drives the integrating device 55, to the speed of motor 10. As the sylphon 56 expands, the shaft 57 is moved to the left carrying the driven disk 58 farther from the center of the driving disk 59 to increase the speed of the shaft 57, the long gear 60 maintaining constant driving engagement between shaft 57 and the integrator 55. Briefly, the motor speed is controlled so that it is proportional to the rate of flow, and the ratio of motor speed to integrator speed is varied in accordance with density so that the counter 55 indicates integrated flow corrected for density. As clearly taught by the preceding modifications the movement may be effected either by pressure, temperature, or both.

In all the forms of the invention described, the compensation is applied so that the flow is measured in units of weight. However, as $$V = \frac{W}{D}$$

and $$W = K\sqrt{HD}$$

$$\therefore V = K\sqrt{\frac{H}{D}}$$

the flow may be recorded, integrated, or measured in units of volume corrected for changes in density, simply by reversing the compensations. That is, in a system such as shown in Fig. 3, the upper sylphon would be connected to respond to temperature, and the lower to respond to pressure. The speed of the motor would then be a linear function of the flow in units of volume.

While I have illustrated several preferred modifications, my invention is not limited thereto, but is of the scope defined by the appended claims.

What I claim is:

1. A system for measuring flow of a fluid comprising means for producing a force varying substantially as the square of the rate of flow, rotatable structure, means for producing a force varying substantially as the square of the speed of rotation of said structure, a system in which said forces are brought into opposition for balancing, means responsive to unbalance of said forces for controlling the speed of rotation of said structure to restore balance, and means responsive to changes in density of said fluid for modifying the speed of said structure for which said forces are balanced.

2. A system for measuring flow of a fluid comprising means for producing a force varying substantially as the square of the rate of flow, rotatable structure, means for producing a force varying substantially as the square of the speed of rotation of said structure, a lever system in which said forces are brought into opposition for balancing, means responsive to unbalance of said forces for controlling the speed of rotation of said structure to restore balance, and means responsive to changes in density of said fluid for varying the lever ratio of said forces to modify the speed of said structure for which said forces are balanced.

3. A system for measuring flow of a fluid comprising a movable member, a pressure-differential device exerting a force thereon varying as the square of the rate of flow of said fluid, a rotating system, a second movable member comprising with said first movable member a lever system and restraining movement of said first movable member by a force varying as the square of the speed of said system, means responsive to changes in density of said fluid for varying the ratio of the lever arms of said members, and means responsive to unbalance of said members for controlling the speed of said system to effect balance.

4. A system for measuring flow of a fluid comprising two pivoted structures, a link connecting said structures and adjustable differentially to change the distances of the points of connection to said structures from their pivotal axes, a pressure-differential device for applying to one of said structures a force varying as the square of the rate of flow of said fluid, a centrifugal device for applying to the other of said structures an opposing force varying as the square of its speed, means for adjusting said link in accordance with changes in density of said fluid, and means responsive to unbalance of said structure for controlling the speed of said centrifugal device to restore balance.

5. A system for measuring flow of fluid comprising a pivoted arm, a centrifugal device for impressing thereon a force varying as the square of the speed of said device, a manometer responsive to changes in the rate of flow for impressing on said arm a force varying as the square of the rate of flow, means for supporting said manometer on said arm for relative movement thereto effecting change in the lever ratio of said forces, means responsive to changes in density of the fluid for effecting said relative movement, and means actuated by oscillations of said pivoted arm for controlling the speed of said device continuously to balance said forces.

6. A system for measuring flow of fluid comprising a lever arm upon which is impressed a force varying as the square of the rate of flow, a rotating structure, a lever arm upon which is impressed a force varying as the square of the speed of said rotating structure, means adjustable to vary the ratio of said lever arms, pressure responsive means and temperature responsive means jointly controlling said adjustable means, and means controlling the speed of said structure continuously to balance said forces where the speed is a linear function of the flow corrected for changes in temperature and pressure.

7. An instrument for measuring flow of a fluid comprising rotatable structure, and a system for controlling the speed of rotation of said structure comprising a centrifugal governor, means for producing a moment varying with the centrifugal force of said governor, means for producing a moment varying as the square of the rate of flow and as a function of the density of the fluid, means for opposing said moments, comprising movable structure actuated in accordance with changes in density, and mechanism for controlling governor speed for maintaining balance of said moments.

8. A measuring system comprising an electric motor, a flyball governor therefor, structure subjected to a force substantially proportional to the square of the rate of flow of a fluid for opposing the centrifugal force of the governor, means for controlling the speed of said motor actuated by unbalance of said forces, means responsive to changes in density of said fluid included in said system, and a flow-measuring device responsive to the speed of said motor and whose readings are compensated for changes in density by said responsive means.

9. Apparatus for determining the flow of a fluid of variable density which comprises rotatable structure for producing a force varying as the square of the speed of rotation thereof, means for producing a force varying as the product of a factor proportional to a pressure differential due to flow of the fluid times a factor proportional to the fluid density, means effecting opposition of said forces, means for varying the speed of rotation of said structure to balance said forces whereby the speed of said structure is a linear function of the flow corrected for changes in density, and flow-determining means responsive to the speed of said structure.

10. Apparatus for determining the flow of a fluid of variable density in terms of weight which comprises rotatable structure for producing a force varying as the square of the speed of rotation thereof, means for producing a force varying as the product of a factor proportional to a pressure differential due to flow of the fluid times a factor inversely proportional to the fluid temperature, means effecting opposition of said forces, means for varying the speed of rotation of said structure to balance said forces whereby the speed of said structure is a linear function of the flow in units of weight, and flow-determining means responsive to the speed of said structure.

11. Apparatus for determining the flow of a gas of varying temperature and pressure in terms of weight which comprises rotatable structure for producing a force varying as the square of the speed of rotation thereof, means for producing a force varying as the product of a factor proportional to a pressure differential due to flow of the gas times a factor proportional to the pressure of the gas times a factor inversely proportional to the temperature of the gas, means effecting opposition of said forces, means for varying the speed of rotation of said structure to balance said forces whereby the speed of said structure is a linear function of the flow of gas in units of weight, and flow-determining means responsive to the speed of said structure.

12. Apparatus for determining the flow of a liquid in terms of weight which comprises rotatable structure for producing a force varying as the square of the speed of rotation thereof, means for producing a force varying as the square of the rate of flow of the liquid, means for effecting opposition of said forces, means for varying the speed of said structure to balance said forces, means responsive to temperature of the liquid for increasing the ratio of said first force to said second force, for which they balance, with increase of temperature, and flow-determining means responsive to the speed of said structure.

13. Apparatus for determining the flow of a gas in terms of weight which comprises rotatable structure for providing a force varying as the square of the speed of rotation thereof, means for producing a force varying as the square of the rate of flow of the gas, means for effecting opposition of said forces, means for varying the speed of said structure to balance said forces, means responsive to the pressure and temperature of the gas to increase the ratio of the second force to the first force, for which they balance, with increase of gas pressure, and to decrease said ratio for increase of gas temperature, and flow-determining means responsive to the speed of said structure.

CRANDALL Z. ROSECRANS.